United States Patent [19]
Hanawa

[11] Patent Number: 4,903,320
[45] Date of Patent: Feb. 20, 1990

[54] APPARATUS FOR SELECTING CONTROL CHANNEL IN MOBILE COMMUNICATION SYSTEM

[75] Inventor: Tetsuya Hanawa, Yokohama, Japan

[73] Assignee: Fujitsu Limited, Kawasaki, Japan

[21] Appl. No.: 169,880

[22] Filed: Mar. 18, 1988

[30] Foreign Application Priority Data

Mar. 20, 1987 [JP] Japan .................................. 62-64150

[51] Int. Cl.$^4$ ............................................... H04Q 7/00
[52] U.S. Cl. ......................................... 455/34; 455/54; 455/166
[58] Field of Search ...................... 455/33, 34, 54, 56, 455/58, 68, 166, 236, 188; 340/825.5; 379/61, 62, 66, 59

[56] References Cited

U.S. PATENT DOCUMENTS 4,392,242  7/1983  Kai ......................................... 455/34
4,400,585  8/1983  Kaman et al. ........................ 455/34
4,434,504  2/1984  Fredrickson ......................... 455/34

Primary Examiner—Joseph A. Orsino
Assistant Examiner—Frank M. Scutch, III
Attorney, Agent, or Firm—Staas & Halsey

[57] ABSTRACT

In a mobile communication system having two operating systems co-existing in one area, a mobile station having a transmitting and receiving circuit and a control unit for subscribing to one of the two mobile communication systems by selecting a control channel thereof is provided. Accordingly, a normal scan of the control channel of the subscribed-to system is activated, and then an extra scan of the control channel is activated when the control channel is not available during the normal scan. The possibility of an involuntary connection to a non-subscribed-to system is thereby reduced when the mobile station is temporarily in a blind section of the subscribed-to system.

8 Claims, 7 Drawing Sheets

CA: BLIND SECTION OF SYSTEM A
CB: BLIND SECTION OF SYSTEM B

APPARATUS FOR SELECTING CONTROL CHANNEL IN MOBILE COMMUNICATION SYSTEM

BACKGROUND OF THE INVENTION (1) Field of the Invention

The present invention relates to an apparatus for selecting dedicated control channels in a mobile communication system in a service area having two competing service systems.

(2) Description of the Related Art

The automobile has become indispensable in contemporary life, and comfort and convenience when driving has become increasingly important. To this end, vehicles can be provided with a mobile communication system which can be used as a telephone system.

An automobile equipped with a mobile communication system, e.g., a mobile telephone system, is called a mobile station, and this mobile station can communicate not only with a fixed telephone such as a telephone in an office or at home but also with another mobile station. This communication is established by radio waves between the mobile station and a land station, and transferred to a conventional telephone system at the land station.

In a typical mobile communication system, for example, the "Cellular system" used in the United States, two companies may compete in one service area, i.e. a system A and a system B exist in one service area as shown in FIG. 1. Each system has a certain number of control channels and a large number of voice channels having different frequency ranges. For example, in the Cellular system, there are 21 control channels and 312 voice channels for each system, as shown in FIG. 2. The frequencies $\alpha$ to $\beta$ are assigned to the voice channels of system A, and the frequencies $\beta$ to $\gamma$ are assigned to the control channels of system A. The frequencies $\gamma$ to $\delta$ are assigned to the control channels of system B, and the frequencies $\delta$ to $\epsilon$ are assigned to the voice channels of system B ($\alpha<\beta<\gamma<\delta<\epsilon$). Each mobile station subscribes to one of the two systems, A or B; in the Cellular system, the subscribed-to system is called the "home system" and the other system is called the "roam system".

Note, since these terms "home system" and "roam system" in the Cellular system enable an easy understanding and discrimination between the subscribed-to system and the other system, these terms will be used hereinafter.

When power is applied to the mobile station, the mobile state first scans the dedicated control channels of the home system, and tunes in to the strongest or second strongest dedicated control channel of the home system. In other words, the mobile station seeks a dedicated control channel on which an outgoing call (call send) or incoming call (call receive) can be reliably transmitted or received. After the mobile station is tuned to one of the dedicated control channels, it enters a call send or call receive waiting state. In this state, if a call send or call receive mode is activated by the user, the mobile station tunes in to one of the voice channels in accordance with a command from the land station through the dedicated control channel. The scan of the dedicated control channel is activated at predetermined periods, such as every 5 minutes, or after the end of each call.

If the mobile station cannot tune in to the strongest or second strongest dedicated control channel during the scan of the home system, then it is determined that the home system cannot be used, and thus the mobile station scans the dedicated control channels of the roam system. If during this scan, the mobile station can tune in to the strongest or second strongest dedicated control channel of the roam system, the mobile station enters a call send or call receive waiting state in the roam system. Namely, the mobile station can use the roam system when the home system is not available. However, if a call send or call receive mode is activated when the mobile station is in the waiting state in the roam system, the mobile station must pay an extra fee to the roam system.

The mobile station may move through an area which is a blind section CA of the home system as shown in FIG. 1. For example, the blind section CA can be due to a high building or a mountain between the mobile station and the land station, and is not necessarily a blind section for the roam system. Therefore if the mobile station scans the dedicated control channels at this time, the mobile station enters the call send or call receive waiting state in the roam a system, and this state cannot be changed until the next scan of the dedicated control channel, even if the mobile station has passed out of the blind section CA in the meanwhile. If a call send or call receive mode is activated in the above state, the mobile station must use the roam system even though the mobile station is in an area where the home system is available, and thus must pay an extra fee.

SUMMARY OF THE INVENTION

An object of the present invention is to provide an apparatus by which the necessity of paying an extra communication fee while the mobile station is passing through a small blind section of the home system is avoided.

According to the present invention, timer means is provided with scan control means which controls the scan of the dedicated control channels of the mobile communication system. The timer means acts to prolong the scanning time of the home system when the home system is not available. Thus, the possibility of an involuntary use of the roam system is reduced when the mobile station is temporarily in the blind section of the home system.

BRIEF EXPLANATION OF THE DRAWINGS

The present invention will become more clearly understood from the description as set forth below with reference to the accompanying drawings, wherein.

DESCRIPTION OF THE PREFERRED EMBODIMENTS

Figure 3:
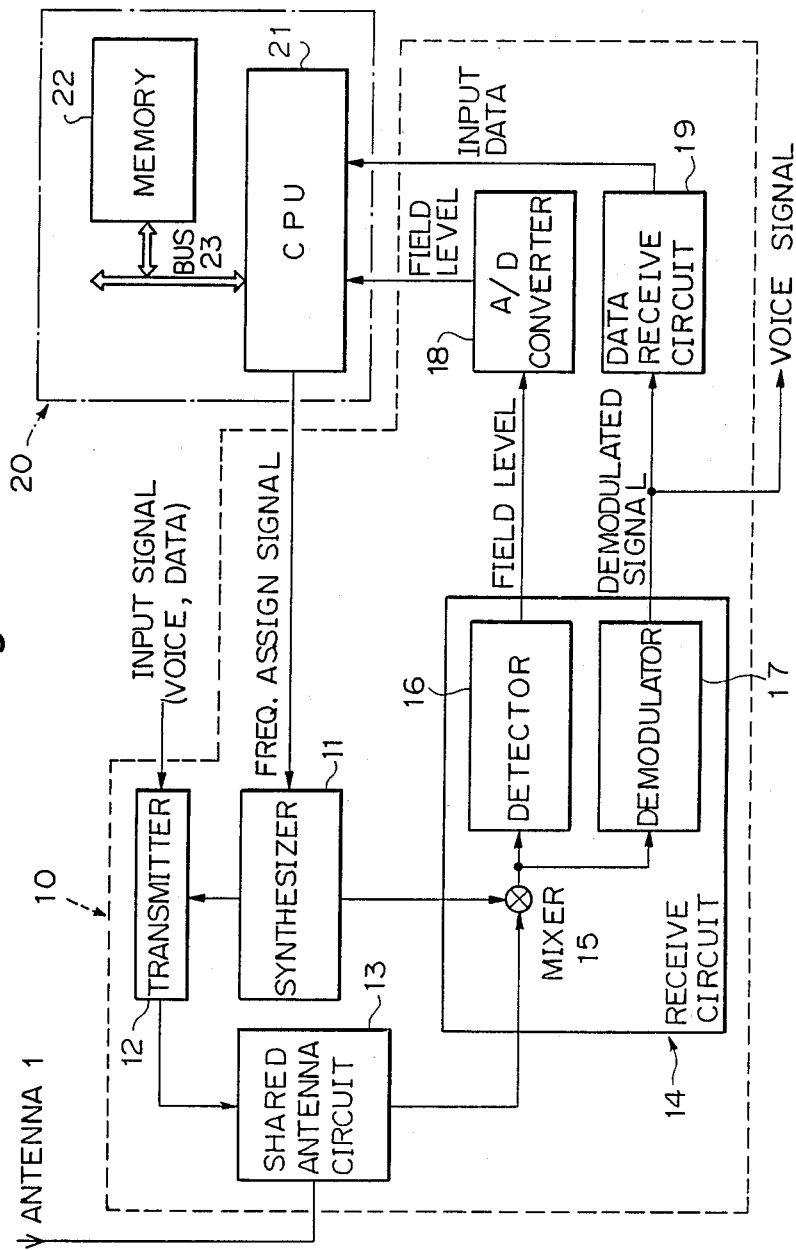
FIG. 3 is a schematic circuit diagram of a mobile station according to the present invention.

FIG. 3 is a circuit diagram of one embodiment of an apparatus for controlling the scanning of dedicated control channels of a mobile communication system according to the present invention. This apparatus is provided with an antenna 1, a transmitting and receiving unit 10, and a control unit 20.

The antenna 1 is connected to a shared antenna circuit 13 of the transmitting and receiving unit 10. The transmitting and receiving unit 10 also includes a synthesizer 11, a transmitter 12, a receive circuit 14 which includes a mixer 15, a detector 16 and a demodulator 17, an A/D converter 18, and a data receive circuit 19. The control unit 20 comprises a central processing unit (CPU) 21 and a memory 22, which are connected by a bus line 23.

As the transmitting portion of the transmitting and receiving unit 10, the transmitter 12 is connected to the CPU 21 via the synthesizer 11. The CPU 21 assigns a frequency to the synthesizer 11. The synthesizer 11 delivers a synthesized frequency to the transmitter 12 and the mixer 15 of the receive circuit 14. Voice or data signals to be transmitted are delivered to the transmitter 12, which then modulates these voice or data signals using the synthesized frequency from the synthesizer 11, as a carrier frequency. The transmitter 12 also amplifies the power and delivers the modulated frequency to the antenna 1 to be transmitted to the land station via the shared antenna circuit 13. In this transmitting portion, the CPU 21 changes the frequency assigned to the synthesizer 11 and thereby changes the channel of the dedicated control channel or voice channel.

As the receiving portion of the transmitting and receiving unit 10, the receive circuit 14 is connected to the antenna 1 via the shared antenna circuit 13. The mixer 15 of the receive circuit 14 mixes an input signal received by the antenna 1 with a signal from the synthesizer 11 and changes these signals to an intermediate frequency. The detector 16 detects the field level of the input signal received by the antenna 1, and delivers the detected field level to the A/D converter 18. This field level is converted from an analog level to a digital level by the A/D converter 18 and is delivered to the CPU 21. The demodulator 17 demodulates the voice or data signal from the intermediate frequency, and the voice signal is sent to the speaker of a telephone handset (not shown). The data signal is picked up from the demodulated signal by the data receive circuit 19, and delivered to the CPU 21. The CPU 21 stores the field level and input data in the memory 22 during the scan of the dedicated control channels, and then selects the most suitable dedicated control channel from the stored field level and the stored input data and tunes in to the selected dedicated control channel.

The operation of the control unit 20 of FIG. 3 will be explained with reference to the flow charts of FIGS. 4A, 4B, 5, 6, 7, and 8.

Figure 4A:
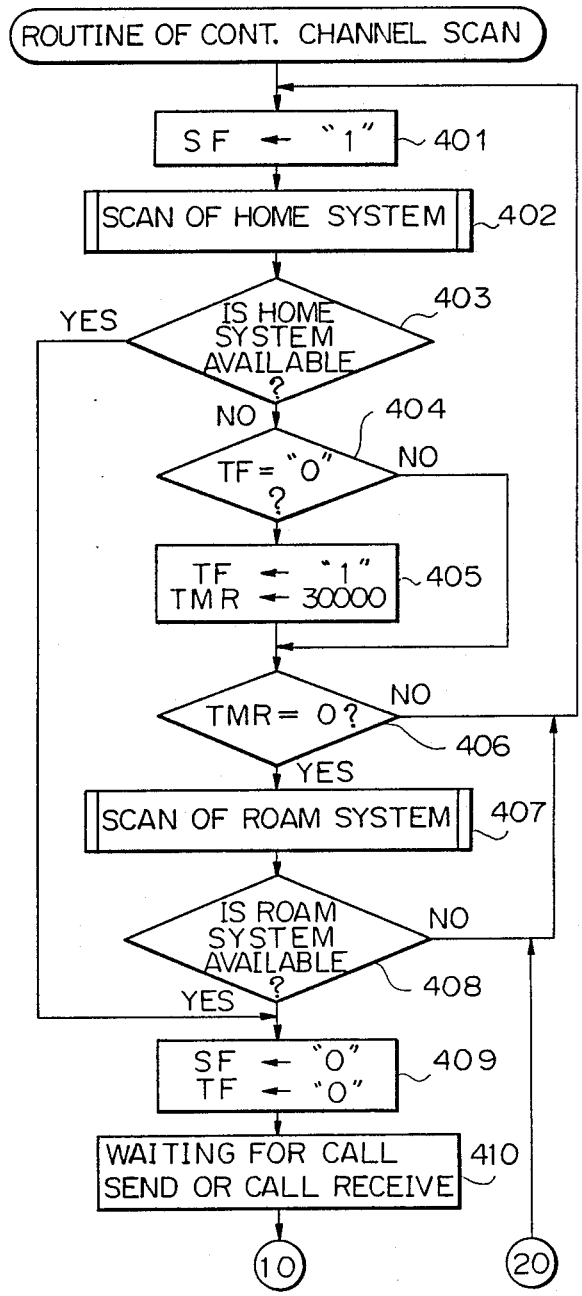
FIGS. 4A and 4B are flowcharts for explaining an example of the scan operation of the apparatus of FIG. 3.
Figure 4B:
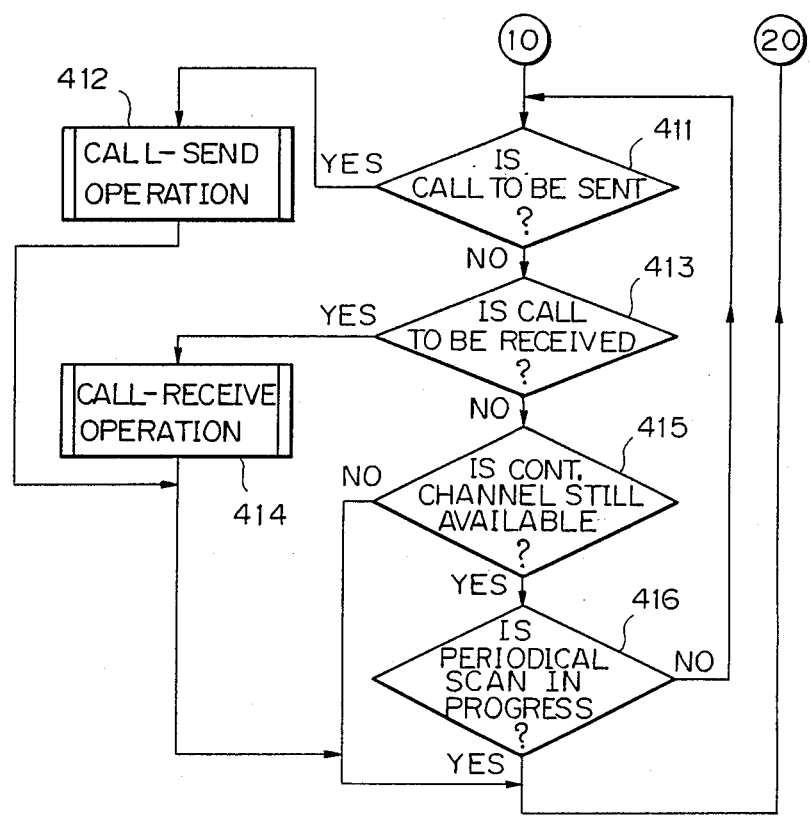

FIGS. 4A and 4B show a scanning routine for tuning in to a dedicated control channel of a mobile communication system. The scanning routine is executed when power is supplied, at predetermined periods such as every 5 minutes, and at the end of a call. The scan operation of the control unit 20 is divided into three stages. In the first stage, the control unit 20 can tune in to a dedicated control channel of the home system (home system available); in the second stage, the control unit cannot tune in to a dedicated control channel of the home system during the normal scanning period but only during a prolonged scanning period (home system available by extra scan); in the third stage, the control unit 20 cannot tune in to a dedicated control channel of the home system but can tune in to a dedicated control channel of the roam system (only roam system available). Accordingly, the operation of the control unit 20 will be explained separately in accordance with above described three stages.

(1) First stage (home system available)

Scanning of the home system will be explained in detail with reference to FIGS. 4A and 4B. At step 401, of FIG. 4A a scan flag SF is set to "1", and thus a timer for counting time is activated. The operation of the timer will be explained later with reference to the flow chart shown in FIG. 5. At step 402, a scan of the dedicated control channels of the home system is started, i.e., a scan of the home system is initiated. Then at step 403, it is determined whether or not the home system is available. When the home system is available, the control proceeds to step 409, to reset the flag SF and a timer flag TF, and then proceeds to step 410. The timer flag TF will be explained in more detail with regard to the second stage. At step 410, the control sets the mobile station to the waiting state for either an out going call, i.e., "call send" mode, or an incoming call, i.e., "call receive" mode. The control then proceeds to step 411 (FIG. 4B).

FIG. 4B shows the operation after one of the dedicated control channels from either system is selected by the control unit 20, since such operation is common to the above mentioned three stages. At step 411, the control determines whether or not a call is to be sent. If a call is to be sent at step 411, the control proceeds to step 412 and a "call send" operation is executed by the control unit 20. This "call send" operation is conventionally known and it is not directly related the feature of the present invention, and thus an explanation thereof is omitted. If a call is not to be sent at step 411, the control proceeds to step 413 and determines whether or not a call is to be received. If a call is to be received at step 413, the control proceeds to step 414 and the "call receive" operation is executed by the control unit 20. This "call receive" operation is also conventionally known and is not directly related to the feature of the present invention, and thus an explanation thereof is omitted. If a call is not to be received at step 413, the control proceeds to step 415 and it is determined whether or not the dedicated control channel is still available. If the dedicated control channel is still available, the control proceeds to step 416 and it is determined whether or not the predetermined periodical scan is being carried out. If the periodic scan is not underway, the control proceeds to step 411 and the operation flow is repeated.

When the "call send" operation at step 412 or the "call receive" operation at step 414 is completed, the control proceeds to step 401 of FIG. 4A, and a scan of the dedicated control channels is again executed. Also, if a dedicated control channel is not available at step 415, or the periodic scan time is being carried out at step 416, the control proceeds to step 401 of FIG. 4A.

(2) Second stage (home system available by extra scan)

If the home system is not available, after steps 401 to 403, the control proceeds to step 404, and it is determined whether or not the timer flag TF is "0". The timer flag TF is "0" due to an initial routine (not shown) or as a result of step 409. When the control proceeds to step 404 for the first time after power is supplied to the control unit 20 or for the first time after step 407 is once executed, the control therefore immediately proceeds to step 405. At step 405, the timer flag TF is set to "1" and the timer is set to the predetermined timer value TMR, for example 30000, which shows the time for which the extra scanning of the dedicated control channels in the home system is carried out after the finish of the normal scanning of the home system.

Figure 5:
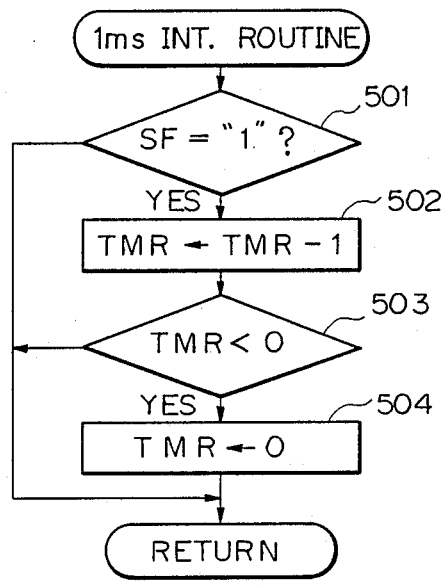
FIG. 5 is a flowchart for explaining a time interruption handling routine of the apparatus of FIG. 3.

The value TMR set within the timer at step 405 is decremented by 1 by an interrupt routine executed every 1 ms, as shown in FIG. 5. At step 501, it is determined whether or not the scan flag SF is "1"; if the flag SF is "1", the control is executing the scan of the dedicated control channels. If the control is not executing the scan of dedicated control channels, i.e., the scan flag SF is "0", the control returns to the normal routine and the value TMR of the timer is not decremented. If the scan flag SF is "1" at step 501, the control proceeds to step 502, i.e., the time value TMR is decremented by 1, and then proceeds to step 503. Steps 503 and 504 show the guard operation of the timer value TMR. At step 503, the control determines whether or not the time value TMR is smaller than 0. If TMR≧0, the control returns to the normal routine, but if TMR<0 at step 503, the control proceeds to step 504 and the timer value TMR is set to 0. Accordingly, the minimum value of TMR is kept at 0.

After step 405 of FIG. 4A, the control proceeds to step 406 and it is determined whether or not the timer value TMR is 0. If TMR≠0, the control proceeds to step 401 and the scan of the home system is again executed at step 402. Accordingly, steps 401 to 406 are repeated until the timer value TMR becomes 0, and thus the scan of the home system is prolonged. Note, in this embodiment, an extra scan time of the home system of 30 seconds is added to the normal scan time of the home system. If a dedicated control channel of the home system can be selected during the extra scan of the home system, the control proceeds from step 403 to step 409 and then to step 410, to set the mobile station in the "call send" or "call receive" waiting state. The control then proceeds to complete the above common operation.

(3) Third stage (only roam system available)

When the home system is not available after an extra scan of the home system, the control proceeds from step 406 to step 407 and executes a scan of the roam system. The operation of the scan of the roam system will be explained in detail with reference to the flow chart show in FIG. 6.

Note, if the roam system is available, the control proceeds to step 409 and then step 410, to set the mobile station in the "call send" or "call receive" waiting state, and then control proceeds to complete the above common operation.

Figure 6:
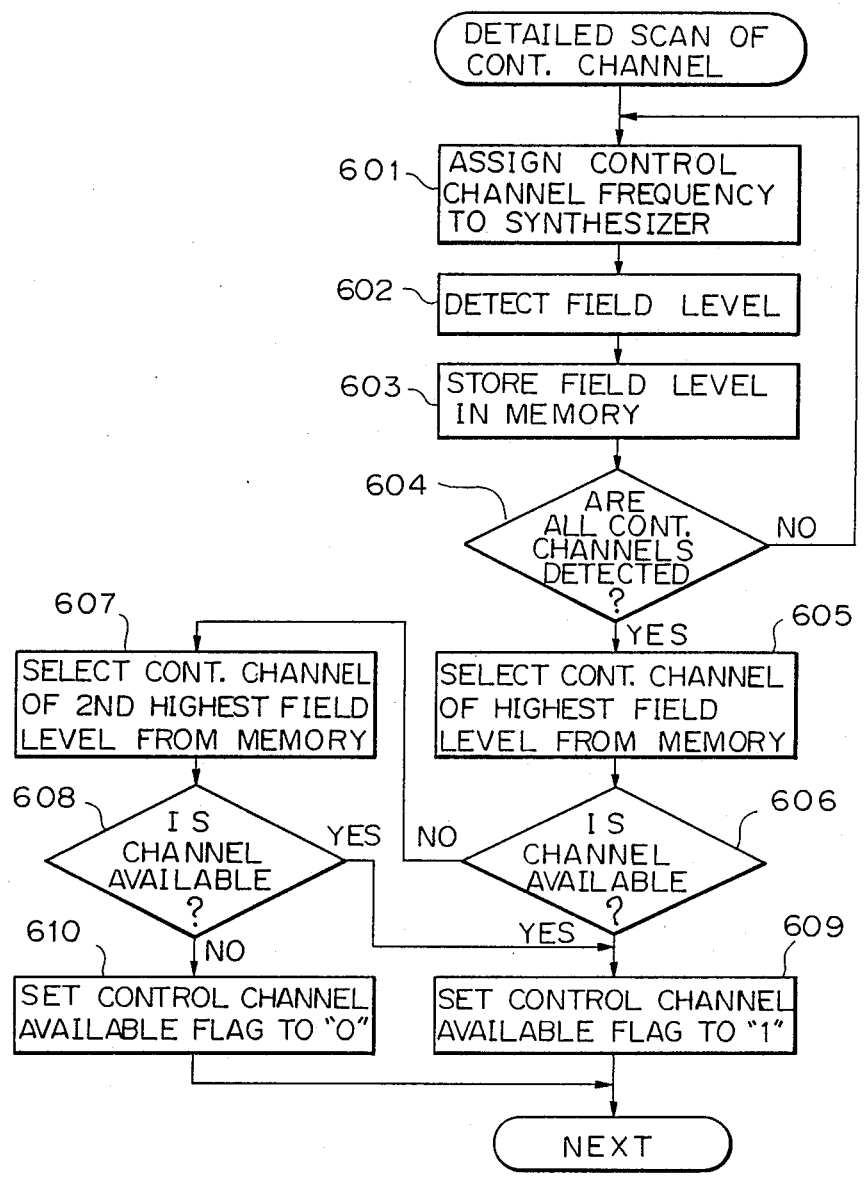
FIG. 6 is a flowchart for explaining a detailed scan operation of the control channel as shown in FIG. 4A.

FIG. 6 shows the details of the scan of the dedicated control channels in both the home system and the roam system. When the control is at step 402 or at step 407, steps 601 to 610 are executed. At step 601, the frequency assign signal is sent from the CPU 21 to the synthesizer 11 and one of the dedicated control channel frequencies is thereby sent to the receive circuit 14. Then, at step 602, the level of the dedicated control channel is detected by the detector 16, and at step 603, the detected field level of the control channel is stored in the memory 22. At step 604, it is determined whether or not all control channels are detected. These steps are continued until all control channels are detected.

When all control channels are detected, the control proceeds to step 605, and the control channel having the highest field level is selected from the memory 22. Then at step 606, it is determined whether or not the selected control channel is available. If the dedicated control channel having the highest field level is available, the CPU 21 sets the control channel available flag. If the control channel having the highest field level is not available, the control proceeds to step 607. At step 607, the control channel having the second highest field level is selected from the memory 22, and then at step 608, it is determined whether or not the selected control channel is available. If the control channel having the second highest field level is available, the CPU 21 sets the control channel available flag, but if the control channel having the second highest field level is not available, the control proceeds to step 610, and the control channel available flag is reset.

Figure 7:
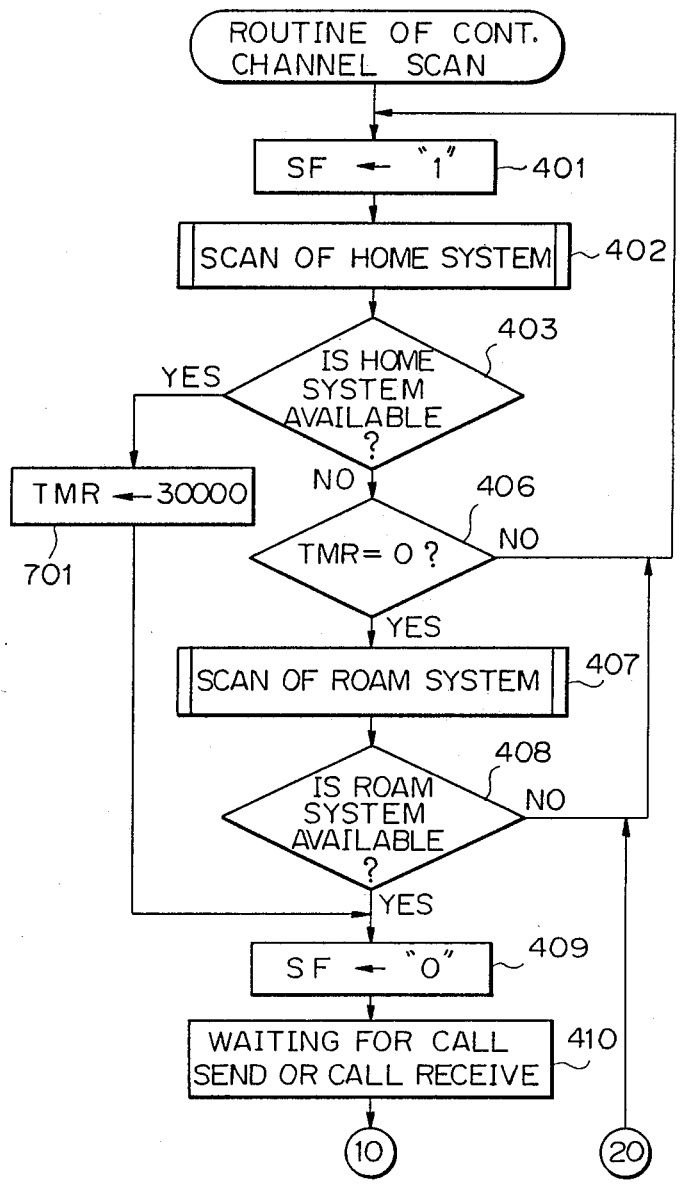
FIG. 7 is a flowchart for explaining another example of the scan operation of the apparatus of FIG. 3.

Another operation of the control unit 10 will be explained with reference to FIG. 7. FIG. 7 is a modification of the flow chart shown in FIG. 4A. In FIG. 7, step 701 is added, steps 404 and 405 are deleted, and the time flag TF is not reset at step 409. In this modification, the setting of the timer value TMR is changed. Namely, in FIG. 4A, the timer value TMR is always set when the home system is not available at step 403 and the timer flag TF is "0" at step 404, but in FIG. 7, the timer value TMR is always set when the home system is available at step 403. In this modification, the time value TMR is not set when the mobile station remains for a long time in an area where the home system is not available.

Figure 8:
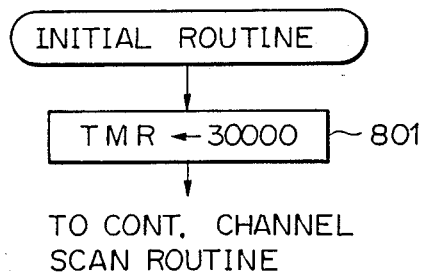
FIG. 8 is a flowchart for explaining a part of an initial routine of FIG. 7.

In this operation, the timer value TMR can be added at step 801 in the initial routine as shown in FIG. 8. If the timer value TMR is added at step 801, the extra scan of the home system is begun when the power is again supplied to the mobile station during the blind section CA and after the power supply is once stopped.

Figure 1:
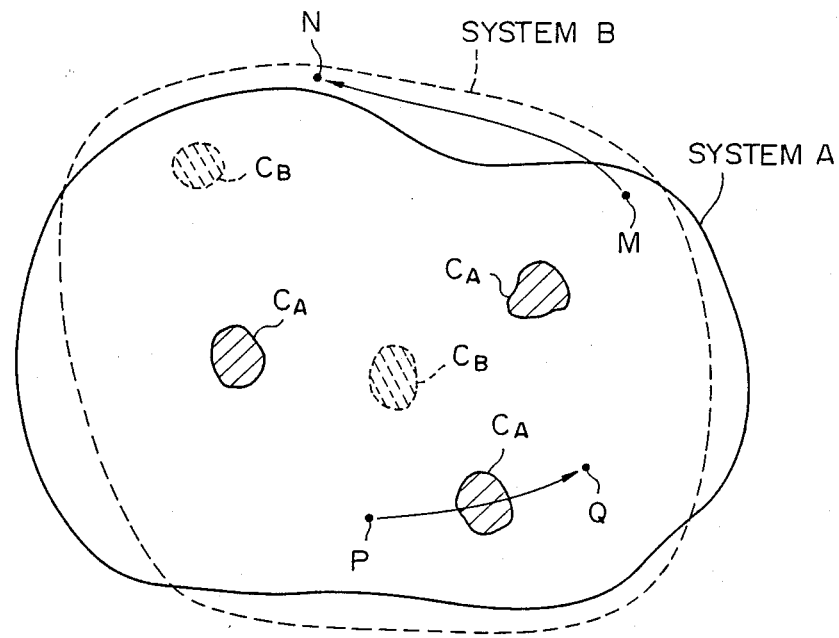
FIG. 1 is a plane view of the service area of the mobile communication system in which two service systems co-exist, having a blind section.
Figure 2:
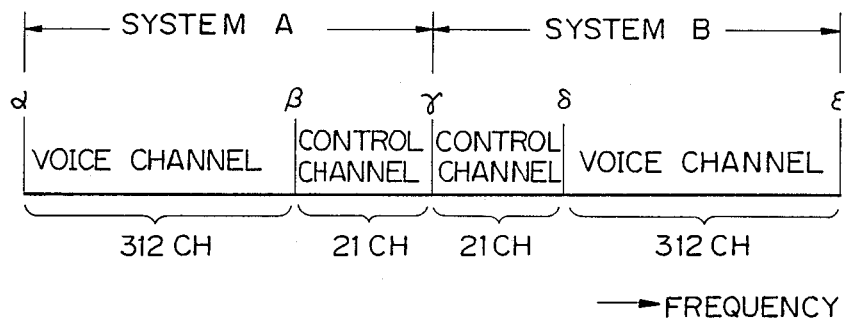
FIG. 2 is a chart of frequency allocations for voice channels and control channels of two co-existing mobile communication systems.

The differences in the operations shown in FIG. 4A and 6 are explained with reference to FIG. 1. When the mobile station is moving from point P to point Q and thus passes through a blind section CA of the home system (system A) within the timer value TMR, the extra scan of the home system is begun in both operations if the periodic scan is carried out while the mobile station is moving through the blind section CA. Conversely, when the mobile station starts from point M where the home system is available, and then soon leaves the area covered by the home system and passes through the service area of the roam system to the point N, the operations are as follows. In the operation as shown in FIG. 4A, the extra scan of the home system after the normal scan of the home system is begun every time the periodic scan time is carried out. Conversely, in the operation as shown in FIG. 6, the extra scan of the home system after the normal scan of the home system is begun only at the time that the periodic scan time is carried out after the mobile station has left the service area of the home system. In this way, an unnecessary extra scanning of the home system after the normal scan of the home system is avoided in the operation as shown in FIG. 6, when the mobile station is not in the service area of the home system.

I claim:

1. An apparatus provided in a mobile station for selecting dedicated control channels having a field level in a mobile communication system, said apparatus having a transmitting and receiving circuit, the mobile station being a subscriber to one of two mobile communication systems and can use the service of a nonsubscribed-to system when the service of a subscribed-to system is not available, said apparatus comprising:
   first driving means for driving said transmitting and receiving circuit to scan the dedicated control channels of the subscribed-to system;
   detecting means for detecting the field level of the scanned dedicated control channels;
   determining means for determining whether at least one of the scanned dedicated control channels has a predetermined field level and is available;
   setting means for setting said transmitting and receiving circuit to a state of waiting for an outgoing call and for an incoming call when said determining means determines that one of the dedicated control channels has the predetermined field level and is available;
   scan repeat means for driving said transmitting and receiving circuit to continue the scan of the dedicated control channels of the subscribed-to system for a predetermined time when none of the scanned dedicated control channels have the predetermined field level and are available;
   second driving means for driving said transmitting and receiving circuit to scan the dedicated control channels of the non-subscribed-to system after said predetermined time has passed.

2. An apparatus set forth in claim 1, further comprising:
   change detecting means for detecting a change of the dedicated control channels of the subscribed-to system from an available state to an unavailable state; and
   prohibiting means for prohibiting said scan repeat means from driving said transmitting and receiving circuit to continue the scan of the dedicated control channels of the subscribed-to system except when a change of the subscribed-to system from the available state to the unavailable state is detected by said change detecting means.

3. An apparatus as set forth in claim 1, further comprising:
   change detecting means for detecting a change of the dedicated control channels of the subscribed-to system from an available state to an unavailable state;
   power detecting means for detecting a supply of power to the mobile station; and
   prohibiting means for prohibiting said scan repeat means from driving said transmitting and receiving circuit to continue the scan of the dedicated control channels of the subscribed-to system except when the change of the subscribed-to system from the available state to the unavailable state is detected by said change detecting means and the supply of power to the mobile station is detected by said power detecting means.

4. An apparatus as set forth in claim 1, wherein said predetermined time is selected to not interfere with a call received by the mobile station.

5. An apparatus as set forth in claim 4, wherein said predetermined time is between 30 to 60 seconds.

6. A control unit for a mobile transceiver subscribing to a first mobile communication system, the first system sharing an area common to a second mobile communication system, the second system being able to be accessed by the mobile transceiver, said control unit controlling scanning and selection of communication channels in the first and second systems, said control unit comprising:
   scanning means for scanning the first system and the second system for available channels; and
   scan period extending means for extending a scan period of the first system when the mobile transceiver moves into a blind section of coverage area of the first system.

7. A control unit according to claim 6, wherein said scan period extending means comprises:
   determining means for determining if the first system is available;
   flag bit means for providing a timer flag bit having a set state and a reset state;
   bit status means for determining the set or reset state of said flag bit means when said determining means determines that the channels of the first system are not available;
   timer initiation means for setting said flag bit means and providing an initiating a timer having a predetermined count value when said bit status means determines the state of said flag bit means to be reset; and
   timer monitor means for monitoring and detecting the count value of said timer initiation means and controlling said scanning means to re-scan the first system when the monitored count value is not zero.

8. A control unit according to claim 6, wherein said control unit comprises a central processing unit connected to a memory, said central processing unit including means for detecting field levels of the scanned channels of the first and second systems, storing the detected field levels in said memory and selecting one of a first highest and second highest stored field level from said memory.

* * * * *